(12) United States Patent
Christensen et al.

(10) Patent No.: US 6,326,600 B1
(45) Date of Patent: Dec. 4, 2001

(54) METHOD AND APPARATUS FOR DISTORTION REDUCTION IN OPTOELECTRONIC INTERCONNECTIONS

(75) Inventors: Marc P. Christensen, Ashburn, VA (US); Predrag Milojkovic, Bethesda, MD (US); Michael W. Haney, Herndon, VA (US)

(73) Assignee: Applied Photonics, Inc., Fairfax, VA (US)

( * ) Notice: Subject to any disclaimer, the term of this patent is extended or adjusted under 35 U.S.C. 154(b) by 0 days.

(21) Appl. No.: 09/337,353

(22) Filed: Jun. 21, 1999

(51) Int. Cl.[7] .................................................... G02B 6/32
(52) U.S. Cl. .................... 250/201.1; 250/551; 385/33; 385/93
(58) Field of Search ................ 250/201.1, 201.9, 250/551; 385/14, 31, 33, 16, 17, 92, 93; 359/115, 117, 109, 135, 139, 127, 131

(56) References Cited

U.S. PATENT DOCUMENTS

| | | | |
|---|---|---|---|
| 5,256,869 | * 10/1993 | Lin et al. ........................ | 250/201.9 |
| 5,291,324 | * 3/1994 | Hinterlong ...................... | 359/135 |
| 5,412,506 | * 5/1995 | Feldblum et al. ............... | 359/569 |
| 5,434,426 | * 7/1995 | Furayama et al. .............. | 250/551 |
| 5,546,209 | * 8/1996 | Willner et al. .................. | 359/115 |
| 5,781,671 | * 7/1998 | Li et al. .......................... | 385/17 |
| 5,857,042 | * 1/1999 | Robertson et al. .............. | 385/33 |

OTHER PUBLICATIONS

Modern Lens Design; Warren J. Smith; Genesee Optics Software, Inc.; Improving a Design; pp. 38–41.
Performance Scaling Comparison for Free–Space Optical and Electrical Interconnection Approaches; Michael W. Haney & Marc P. Christensen; Applied Optics, vol. 37, No. 14, May 10, 1998, pp. 2886–2894.
Microbeam Optical Interconnections Using Microlens Arrays, F.B. McCormick et al., Proceedings of the OSA'a Topical Meeting on Photonic Switching, Mar., 1991.
Diffractive Beauty, Jose N. Mait, Optics & Photonics News / Nov. 1998, vol. 9, No. 11, pp. 21–52.
Low–Distortion Hybrid Optical Shuffle Concept; Marc P. Christensen, et al., Optics Letter, Feb. 1, 1999 / vol. 24, No. 3, pp. 169–171.

\* cited by examiner

*Primary Examiner*—John R. Lee
(74) *Attorney, Agent, or Firm*—Greenberg Traurig; Richard E. Kurtz II

(57) ABSTRACT

An optical interconnection for connecting a first integrated circuit to a second integrated circuit includes a plurality of light sources, a plurality of light detectors, a symmetric imaging system, and a plurality of beam steering elements, one for each of the plurality of light sources. Each of the beam steering elements is configured to steer light from its corresponding light source to a new angle which causes the symmetric imaging system to have an effective aperture closer to its plane of symmetry. A mirror may be inserted in the plane of symmetry of the imaging system that folds the system back upon itself, making the object plane and image plane co-incident.

25 Claims, 12 Drawing Sheets

| | |
|---|---|
| object plane | 310 |
| image plane | 320 |
| light source | 330 |
| light detector | 340 |
| light path | 350 |
| aperture | 360 |
| symmetric optical system, left half | 370 |
| symmetric optical system, right half | 380 |

| | |
|---|---|
| object plane | 410 |
| image plane | 420 |
| light source | 430 |
| light detector | 440 |
| optical axis | 450 |
| plane of symmetry | 460 |
| light path | 470 |
| effective aperture | 480 |
| optical system, left half | 490 |
| optical system, right half | 495 |

| | |
|---|---|
| lens | 1010 |
| beam steering element | 1020 |
| discrete prism | 1030 |

| | |
|---|---|
| object plane | 1110 |
| image plane | 1120 |
| light source | 1130 |
| light detector | 1140 |
| optical axis | 1150 |
| plane of symmetry | 1160 |
| light path | 1170 |
| single symmetric lens | 1180 |
| beam steering element | 1190 |

| object plane | 1210 |
| image plane | 1220 |
| light source | 1230 |
| beam steering element | 1235 |
| light detector | 1240 |
| optical axis | 1250 |
| plane of symmetry | 1260 |
| light path | 1270 |
| effective aperture | 1280 |
| optical system, left half | 1290 |
| optical system, right half | 1295 |

| | |
|---|---|
| object plane | 1310 |
| image plane | 1320 |
| light source | 1330 |
| beam steering element | 1335 |
| light detector | 1340 |
| optical axis | 1350 |
| plane of symmetry | 1360 |
| light path | 1370 |
| effective aperture | 1380 |
| optical system, left half | 1390 |
| optical system, right half | 1395 |

METHOD AND APPARATUS FOR DISTORTION REDUCTION IN OPTOELECTRONIC INTERCONNECTIONS

The government of the United States of America has a non-exclusive license in this invention pursuant to United States Air Force contract No. F33615-97-C-1054.

BACKGROUND OF THE INVENTION

1. Field of the Invention

The invention relates in general to optical design, and in particular to systems for removing or reducing distortion to increase efficiency and remove or reduce crosstalk in optoelectronic interconnections.

2. Related Art

Free-space optoelectronic interconnections are known for moving information, in the form of light energy, from one integrated circuit (IC) to another IC, with part of the transmission path being in free space. The conversion of the information from electrical signals to light energy is performed by light sources and the conversion of the light energy back into electrical signals is performed by light detectors.

Free-space optoelectronic interconnections are projected to provide bandwidth densities on the order of a $10^{12}$ bits/sec/cm$^2$. This bandwidth density exceeds the capabilities of conventional electronics, making free-space optical interconnections an important part of high bandwidth data communications. At this high bandwidth density, if the data rate for each optical source is on the order of $10^9$ bits/sec, 1000 light sources per square centimeter may be required. This equates to a grid of light sources with a source-to-source spacing of on the order of 300 microns.

Free-space optoelectronic interconnections ordinarily require that the light from the sources be confined on light detectors. This is ordinarily accomplished by use of an imaging system. As imaging systems are not perfect, the field of optical design concentrates on minimizing the errors introduced by an imaging system. An optical designer minimizes the five (5) third order aberrations of an optical design to meet the required specifications. These third order optical aberrations are: spherical, coma, astigmatism, field curvature, and distortion. While the first four optical aberrations quantify the confinement and shape of the image of an ideal object point in the image, distortion quantifies the location of the image. Distortion is the misplacement of the chief ray of an object point in the image plane, where the chief ray is the ray which travels through the center of the aperture of the optical system. Distortion is usually given as the image location error as a percentage of its position in the image. For example, an imaging system with only one percent distortion would misplace an image of an ideal point located 1 centimeter off-axis by 1% of 1 centimeter or 100 microns. As set forth above, the light sources will be spaced only ~300 microns apart, as will the light detectors which capture the light. Distortion, which introduces a misplacement of the elements by as much as ⅓ of the grid spacing, is unacceptable for many applications. As described, distortion has a significant detrimental impact on free-space optoelectronic interconnections and should be minimized.

There are three conventional approaches to eliminating the effects of distortion in optical systems: 1) using only on-axis light sources, 2) designing an optical system which is completely symmetric about its aperture, and 3) designing an optical system with sufficiently small distortion to be usable for the application.

FIG. 1 shows a free-space optoelectronic interconnection between integrated circuits 130, 160, which uses only on-axis light sources 110. The integrated circuit 130 includes a plurality of light sources 110 and the integrated circuit 160 includes a plurality of detectors 120. For clarity, only a single light path 150 is shown. Since the detrimental effects of distortion are percentages of the distance the object point, or in this case light source, is from the center of the optical element 140, the resultant misplacement can be made zero if the off-axis distance is zero, e.g., one percent of a zero distance is zero. Thus, placing the light sources on the optical axis of the imaging system results in no apparent distortion in the system. However, if the design is to be applied to a grid of light sources spaced at a small distance, such as 300 microns as described above, then the size of the optical elements can be at most this spacing (e.g., 300 microns). As described in Haney & Christensen, "Performance Scaling Comparison for Free-Space Optical and Electrical Interconnection Approaches," *Applied Optics*, Vol. 37 No. 14 (May 10, 1998), the small size of the optical elements leads to diffraction limitations which severely limit the distance between the light source and the light detectors. As described in the above reference, this limited "throw distance" mandates the use of repeaters in a large interconnection pattern. The use of repeaters obviates many of the benefits of using free-space optoelectronic interconnections in the first place. This is manifested in an increased power requirement, increased system size (footprint area and volume), and increased interconnection latency.

Another approach is to design an optical system that is completely symmetric about its aperture. FIG. 2 is a diagram of the prior art showing an optical system 260, 270 that is symmetric about its aperture 250. It should be noted that the image plane 220 and object plane 210 do not contain light sources and light detectors, respectively. This symmetric system was designed to image a passive object, with light scattering and/or emanating from it in all directions, onto the image plane. This is an important requirement of the symmetric system, as the aperture is placed at the midpoint between the transmitting lens 260 and the receiving lens 270. This aperture placement dictates that, in general, the light path has an angle that is other than ninety degrees with respect to the object plane 210 and the image plane 220. While this system does not suffer from distortion, it only allows beams at select angles to pass through the aperture. These angles are equal to ninety degrees with respect to the image/object plane only if the distance of the object plane 210 to the transmitting lens 260 equals one half the distance between the transmitting lens 260 and the receiving lens 270 equals the distance from the receiving lens 270 to the image plane 220 equals the focal length of the lens. This configuration is shown in FIG. 3, and is named a 4F imaging system, due to the fact that its overall length is four (4) times the focal length of the identical transmitting and receiving lenses 370, 380.

Active light sources for free-space optoelectronic interconnections are ordinarily designed for light emission orthogonal to the IC in which they are embodied. These ICs are typically placed in the object plane of the lens system; therefore, the light emitted from the light source is typically at a ninety degree angle with respect to the object plane 310. While this is appropriate for a 4F system, as depicted in FIG. 3, it is untenable when the distance between the transmitting lens 370 and the receiving lens 380 is not twice (2x) the focal length. FIG. 4 shows the implications of a light source at a ninety degree angle with the object plane, when the transmitting lens 490 to receiving lens 495 distance is greater that twice (2x) the focal length. It should be noted, firstly, that the light paths cross the optical axis 450 at a position not at the midpoint of the transmitting and receiving lenses (490 and 495 respectively). This optical axis crossing defines the system aperture, so the system is no longer symmetric about its aperture and distortion will be present. Secondly, if a physical constraining aperture were placed at the midpoint of the transmitting and receiving lens, the light paths would necessarily be vignetted. In other words, if the system is made symmetric by placing a limiting physical aperture at the midpoint of the transmitting lens 490 and the receiving lens 495, the limited angular extent of the light source 430 will cause it to miss the aperture entirely and not reach the light detector 440. While this symmetric approach for eliminating distortion in traditional passive optical systems has endured great success, it relies on all angles of light being present from the points in the object plane. The narrow angular extent of active light sources in free-space optoelectronic interconnections does not meet this requirement and therefore requires a new approach for eliminating distortion.

The third approach to eliminating the effects of distortion is to minimize, not eliminate, the distortion over the image plane through the addition of lens surfaces to the imaging optics. To achieve reliable interconnects for dense optoelectronic interconnections across a 1-centimeter plane the distortion should be at a fraction of one percent. This requirement is stringent, and typically the addition of several optical surfaces is required. Additional optical surfaces, in turn, increase the complexity, weight, and cost of the optical system.

OBJECTS AND SUMMARY OF THE INVENTION

It is therefore an object of the invention to provide an improved method and apparatus for interconnecting optical sources and detectors.

It is a further object of the invention to provide an improved method and apparatus for eliminating or reducing distortion in optoelectronic interconnections.

It is a further object of the invention to provide optoelectronic interconnections having reduced complexity.

It is a further object of the invention to provide optoelectronic interconnections which can be manufactured at reduced cost.

In a preferred embodiment, the invention provides a method and apparatus for distortion-free or distortion-reducing free-space optical interconnections for connecting a first integrated circuit to a second integrated circuit which includes a plurality of light sources, a plurality of light detectors, a symmetric imaging system, and a plurality of beam steering elements, one for each of the plurality of light sources. Each of the beam steering elements is configured to steer light from its corresponding light source to a new angle which causes the symmetric imaging system to have an effective aperture closer to its plane of symmetry. A mirror may be inserted in the plane of symmetry of the imaging system that folds the system back upon itself, making the object plane and image plane co-incident.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 5:
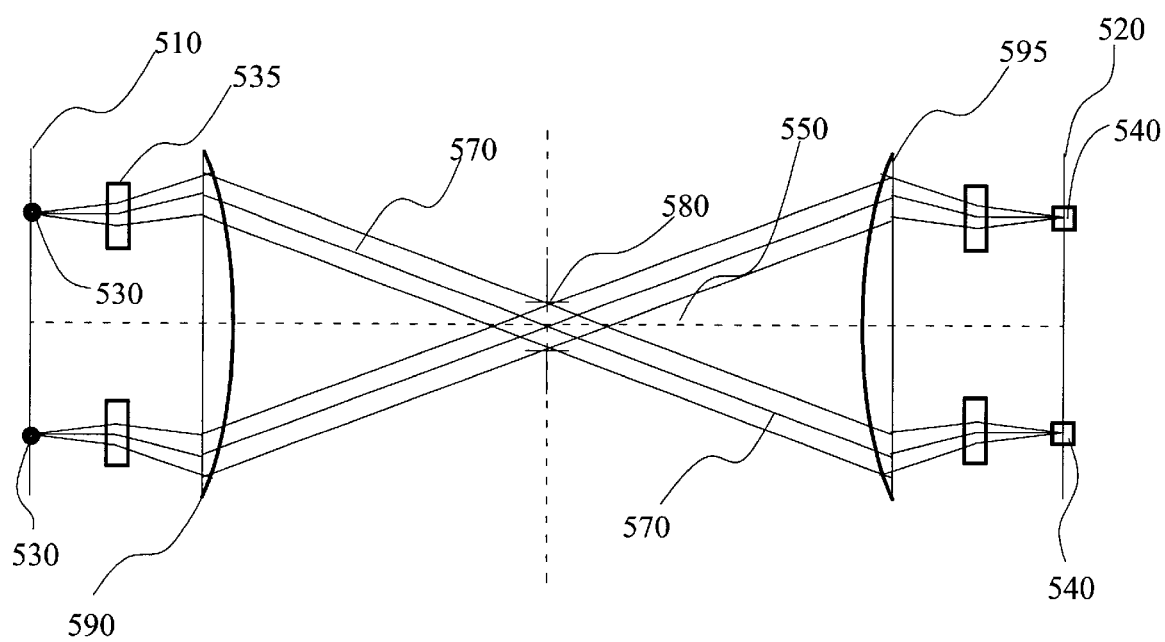
FIG. 5 shows a diagram illustrating the interconnection structure of the invention according to a preferred embodiment.

Substantially distortion-free free-space optical interconnections in accordance with a preferred embodiment of the invention are illustrated in FIG. 5. A plurality of light sources 530 are placed in the object plane 510 of a symmetric imaging system 590, 595. Light detectors 540 are placed in the image plane 520 of the symmetric imaging system 590, 595. Beam steering devices 535 are positioned between the light sources 530 and the left half 590 and the imaging system. Likewise a plurality of beam steering devices are placed between the right half 595 of the imaging system and the light detectors 540.

In operation, the beam steering devices 535 introduce an angular deviation of the light path to cause the effective aperture 580 of the system to be close to or at a location of the midpoint of the symmetric imaging system 590, 595. Each light source 530 emits a beam that follows a light path 570, which passes though a separate beam steering device. A beam steering device which is located between the symmetric imaging optics 595 and the light detector 540 steers the light path 570 to an angle equal to ninety degrees with respect to the image plane.

The beam steering devices 535 preferably comprise a refractive element, such as a micro-prism, or a diffractive element such as a diffraction grating. However, other known beam-steering means may be used without departing from the spirit and scope of the invention. The symmetric imaging system 590, 595 may comprise any number of refractive or diffractive elements which are configured so as to be symmetric with respect to the midpoint of the optical axis 550. The light sources may comprise any known suitable light source, including, e.g., light emitters, surface-emitting laser diodes (particularly the vertical-cavity surface emitting laser, or VCSEL, type), light-emitting diodes, and light modulators.

In accordance with the invention, distortion can be effectively eliminated (equal to zero) for every light path in the system, and the lengths of the light paths are not limited by small (order of light source spacing) optical systems; nor are the light paths limited to a 4-F configuration. Light paths orthogonal to the object plane are not blocked (vignetted) in a symmetric optical system, and the only additional element to the symmetric optical imaging system is a simple beam steering element placed at each light source and each light detector. With only the addition of two (2) planes of beam steering elements to effect the removal of distortion, this invention is simple, light, and inexpensive.

Figure 6:
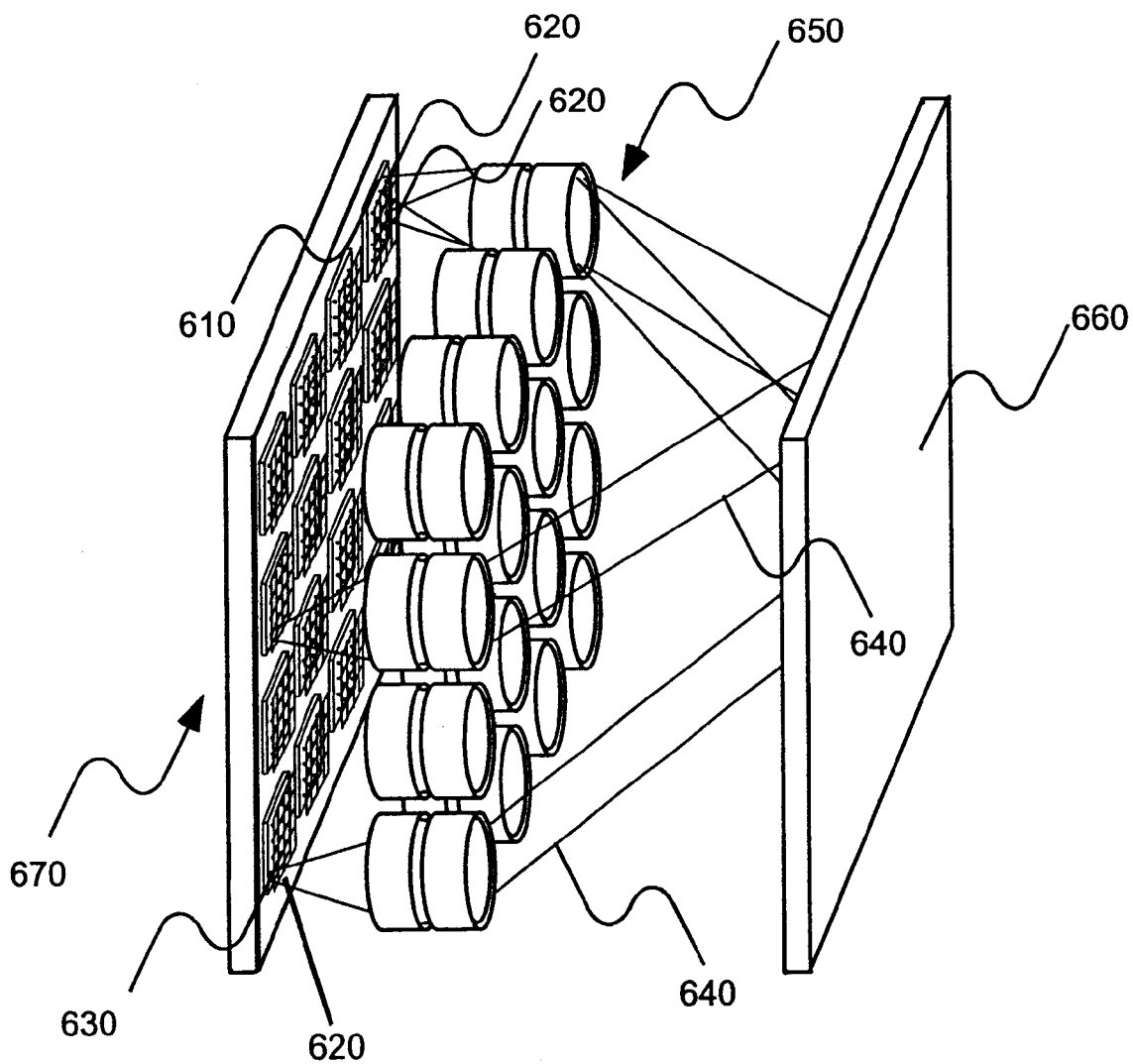
FIG. 6 shows a perspective view illustrating an embodiment of the invention wherein a mirror is inserted in the plane of symmetry of the imaging system that folds the system back Pon itself.

FIG. 6 shows an alternative embodiment of the invention wherein a mirror 660 is inserted in the plane of symmetry of an array of symmetric imaging systems 650. The mirror 660 folds the system back upon itself, making the object plane and image plane co-incident. An array of beam steering elements 620 are provided between the array of light sources 610 (on a multiple-IC substrate 670) and the array of detectors 630, each beam steering element steering light 640 from its corresponding light source to a new angle which causes the symmetric imaging system to have an effective aperture at or closer to its plane of symmetry. This single plane packaging reduces the degrees of freedom in the system during alignment, facilitating a fast, easy and automatable alignment approach. The single plane system reduces the overall system size since the volume has been roughly halved.

Figure 7:
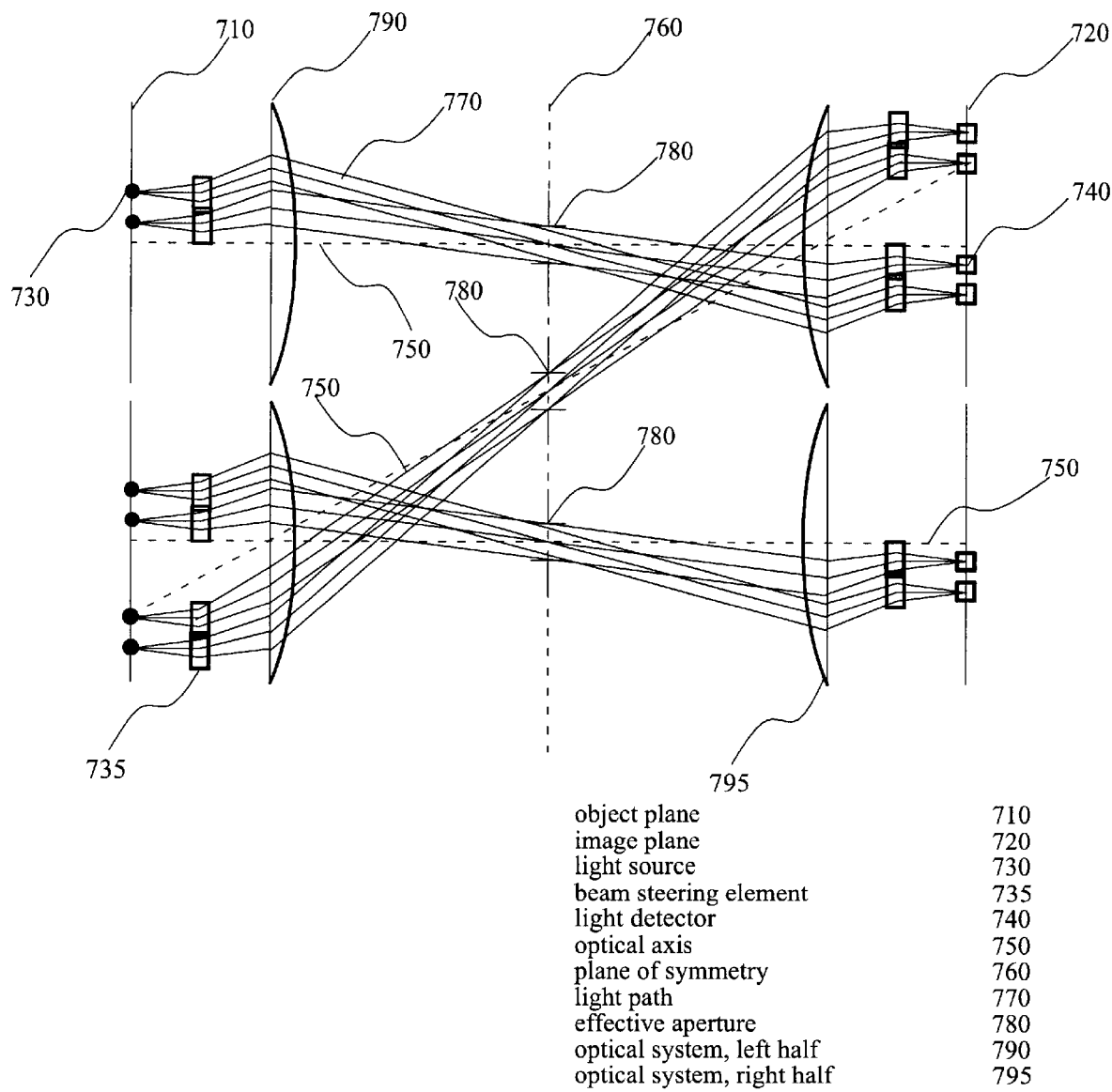
FIG. 7 is a diagram showing an embodiment of the invention which includes multiple symmetric optical systems.

FIG. 7 shows an embodiment of the invention which includes multiple symmetric optical systems interconnect multiple ICs in an off-axis interconnection system. There is a separate aperture for each lens pair in the interconnection module and both clusters utilize the same region of the transmitting lens. Such a system is useful for interconneting multiple ICs to multiple ICs, thereby providing higher aggregate bandwidth between and among the ICs. This design is useful in the design of multi-processor architectures where each IC can contain processor, memory, or switching resources.

Figure 1:
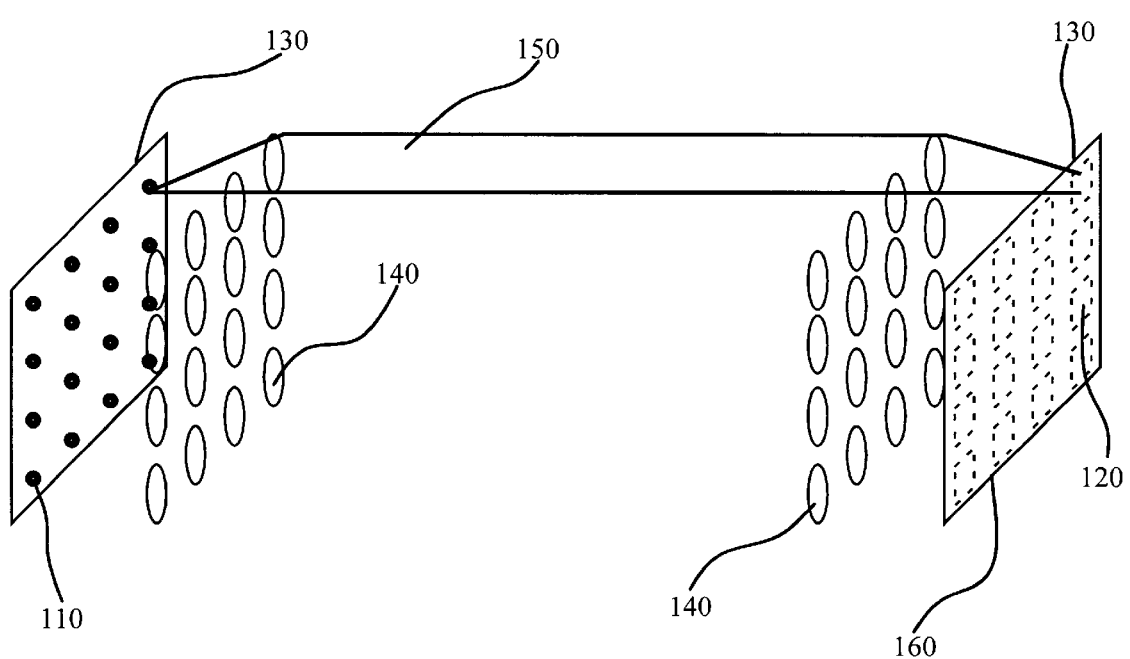
FIG. 1 shows a diagram of the prior art showing a free-space optoelectronic interconnection system with a single optical system centered on each light source.
Figure 2:
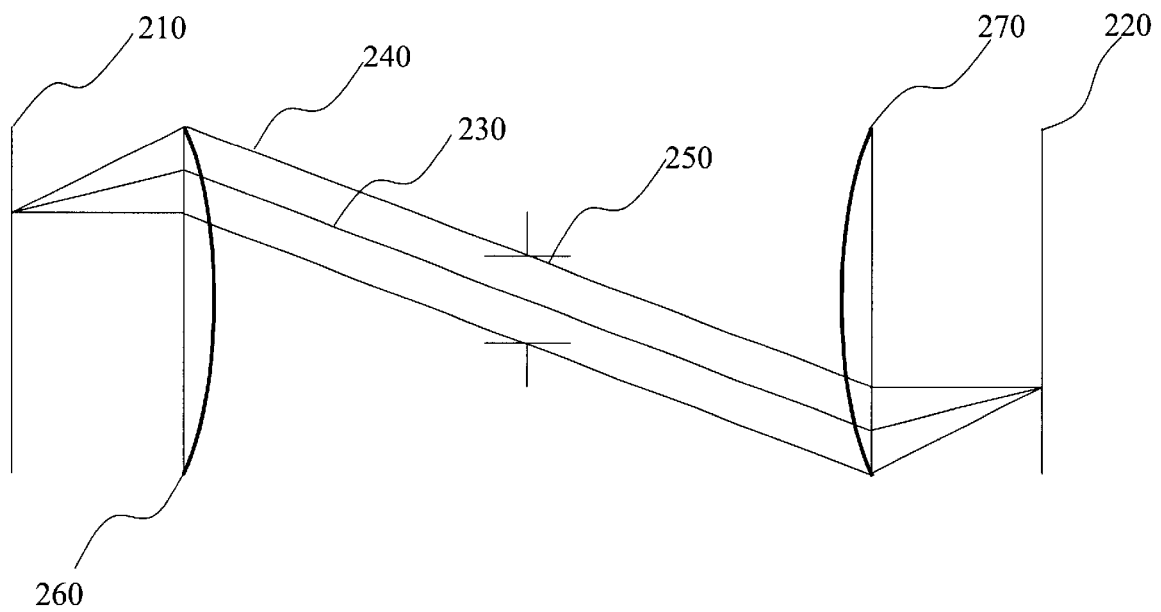
FIG. 2 shows a diagram of the prior art showing an optical system that is symmetric about its aperture.
Figure 3:
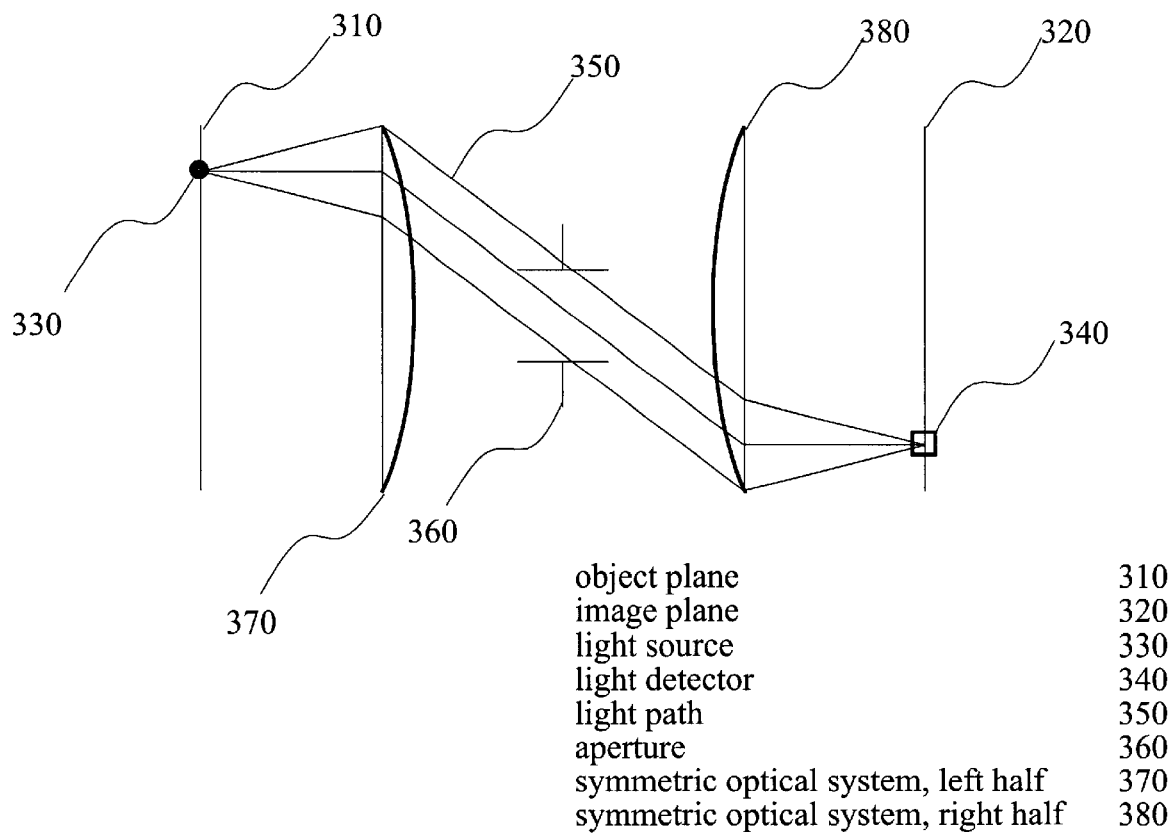
FIG. 3 shows a diagram of the prior art showing a 4F imaging system, in which the angles of the light paths 350 with the object plane 310 and the image plane 320 are ninety degrees.
Figure 4:
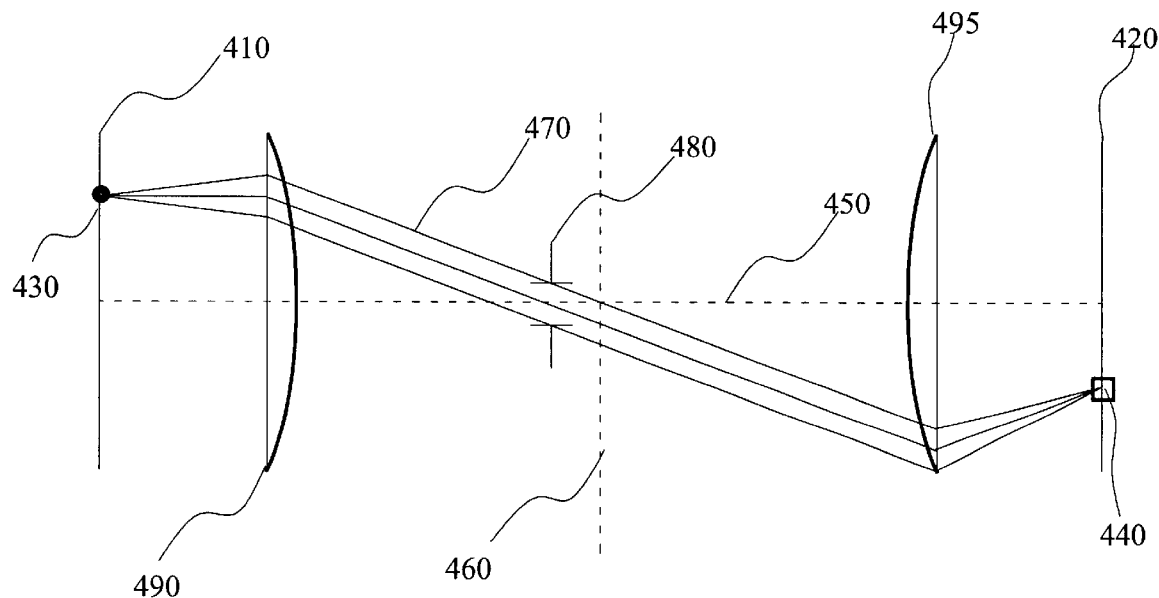
FIG. 4 shows a diagram of the prior art demonstrating the implications of a light source at a niety degree angle with the object plane, when the transmitting lens 490 to receiving lens 495 distance is greater that twice (2x) the focal length.
Figure 8:
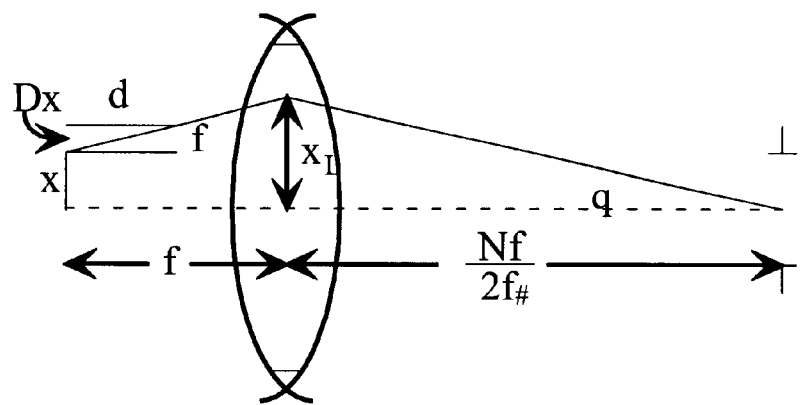
FIG. 8 is a diagram showing the geometry for deflection angle calculation.

FIG. 8 shows the geometry for deflection angle calculation for a thin lens. In embodiments where more complicated optical systems are utilized, the angle would be chosen by using an optical ray tracing software package to move the effective aperture towards the plane of symmetry of the lens system. In particular, the figure shows the deflection angle, f, as it relates to the geometry of the other variables of the interconnect system for an on-axis cluster. The off-axis distance of the light source under consideration is x, the focal length of the lens is f, f# is the ratio of this focal length to the lens diameter, q is the angle of the collimated beam with respect to the optical axis from the light source, N is the number of chips on one side of the square array (see FIG. 1), xL is the height the deflected beam hits the lens plane, d is the distance from the light source plane to the diffraction grating, and Dx is the effective displacement of a VCSEL emitting parallel to the optical axis.

In FIG. 8 there are two congruent relationships:

$$\tan\theta = \frac{x}{f} = \frac{2x_L f_\#}{Nf}, \text{ and} \tag{1}$$

$$\tan\phi = \frac{\Delta x}{d} = \frac{(x_L - x)}{f}. \tag{2}$$

From Equations 1 and 2, the deflection angle as a function of x the following is:

$$\phi = \arctan\left[\frac{x}{f}\left(\frac{N}{2f_\#} - 1\right)\right]. \tag{3}$$

Figure 9:
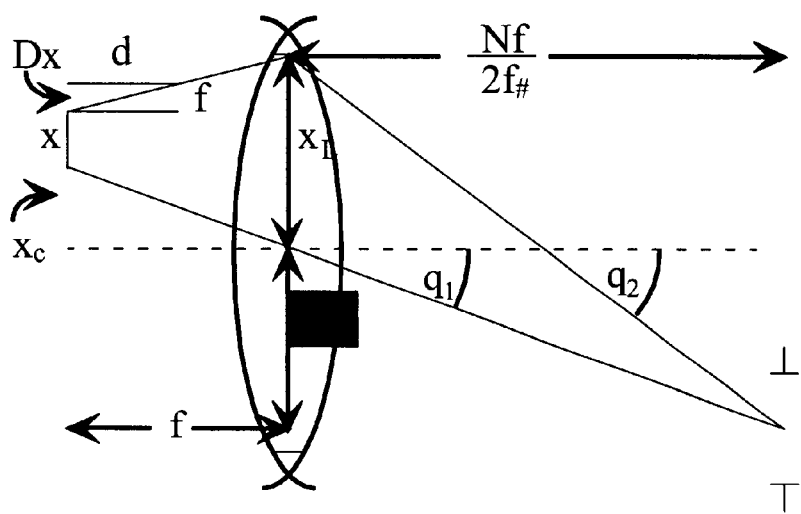
FIG. 9 is a diagram showing the geometry for off-axis analysis.

The geometry for analyzing the off-axis interconnection is depicted in FIG. 9. The variables retain their original meanings in this figure, with the addition of: 1) the lateral distance from the lens center to the center of the cluster under examination xc, 2) the offset from the lens center to the aperture center (half the lateral distance to the receiving lens) xoff, and 3) there are now two beam angles q1 and q2. The angle from the center of the cluster is q1, while the angle of the beam from the element under question is q2.

In this case the congruence relationships are:

$$\tan q1 = \frac{x_c}{f} = \frac{2x_{off} f_\#}{Nf}, \text{ and} \tag{4}$$

$$\tan q2 = \frac{x_c + x}{f} = \frac{2(x_{off} + x_L f_\#)}{Nf}, \text{ and} \tag{5}$$

$$\tan q = \frac{\Delta x}{d} = \frac{x_L - x - x_c}{f}. \tag{6}$$

Using Equations 4–6 to solve for the diffraction angle as a function of x the following is obtained:

$$q = \arctan\left[\frac{1}{f}\left(\frac{Nx}{2f_\#} - x - x_c\right)\right]. \tag{7}$$

This is the same as Equation 3, except that an angular offset proportional to $x_c$ has been added.

Inspection of FIGS. 8 and 9 reveals that the effective size of the cluster is slightly increased. This effect stems from the finite distance, d, between the light source and the steering element. For simplicity, one can examine the on-axis case in detail. The fractional increase in cluster size is given by:

$$\frac{\Delta x}{x} = \frac{d}{f}\left(\frac{N}{2f_\#} - 1\right). \tag{8}$$

Assuming N=4 and an f/1 optical system, the term in parentheses is equal to 1. The remaining term (d/f) is a small magnification—i.e., an increase on the order of 5% when f=1 cm and d=0.5 mm. If the optical layout uses a regular grid pattern, this small cluster growth poses a problem. However, since the optical I/O in the system of the invention is laid out on a self-similar fractal grid geometry, the small magnification of cluster size does not create any overlap between adjacent clusters.

Figure 10:
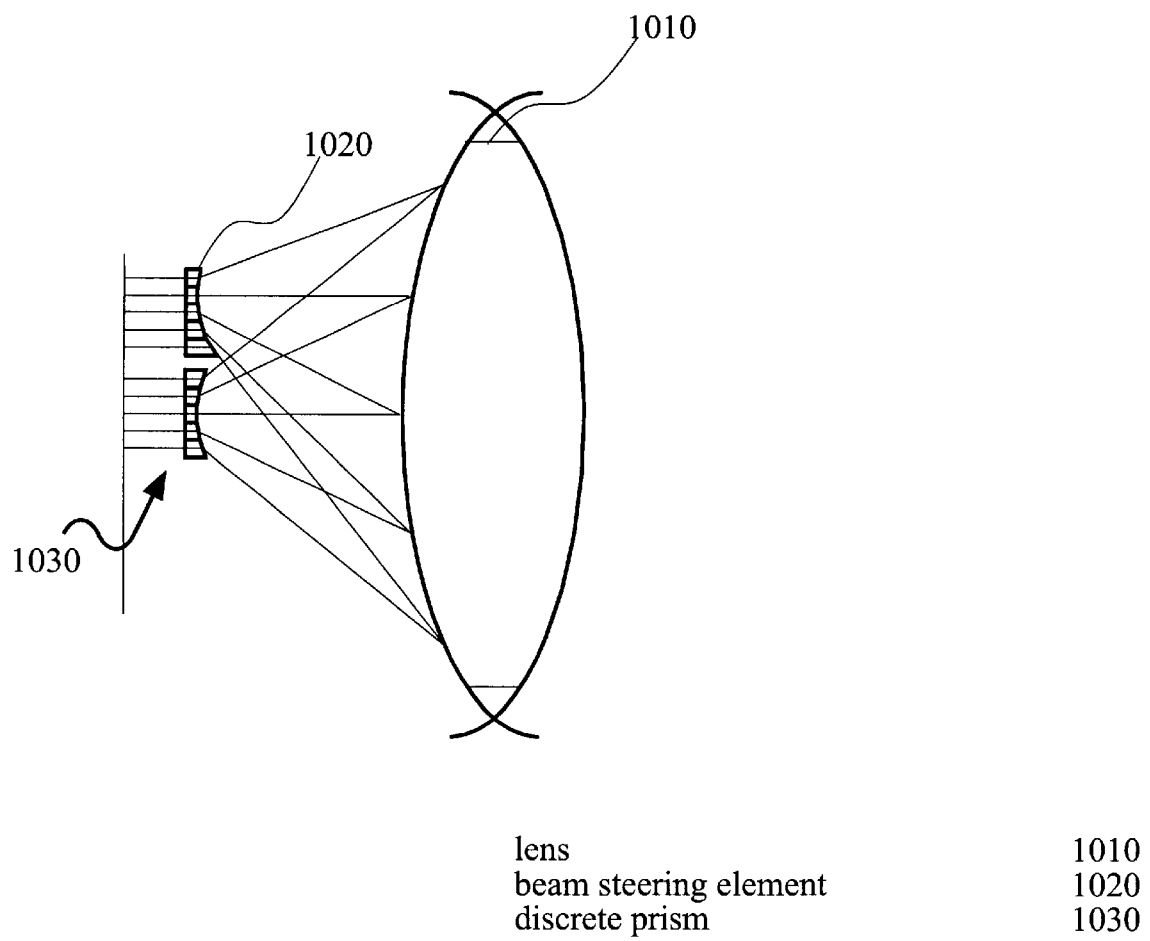
FIG. 10 is a diagram which demonstrates that as x varies along a cluster, the deflection angle varies in such a way as to make the collection of prisms or gratings act as a discreet negative lens.

FIG. 10 demonstrates that as x varies along the cluster the deflection angle varies in such a way as to make the collection of prisms or gratings act as a discreet negative lens. The focal length (feff) of this effective lens is given by:

$$f_{eff} = \frac{f}{\frac{N}{2f_{\#}} - 1}. \quad (9)$$

This discrete negative lens may be approximated by a continuous lens which would introduce power in addition to deam steering ability. In this embodiment, there may be a separate negative lens for each group of light sources and light detectors which connect a given pair of ICs. It is envisioned that the beam steering element in any embodiment of the invention may incorporate optical focussing ability in addition to the beam steering function. Such a modification to the design will improve light beam shaping and image spot confinement.

Figure 11:
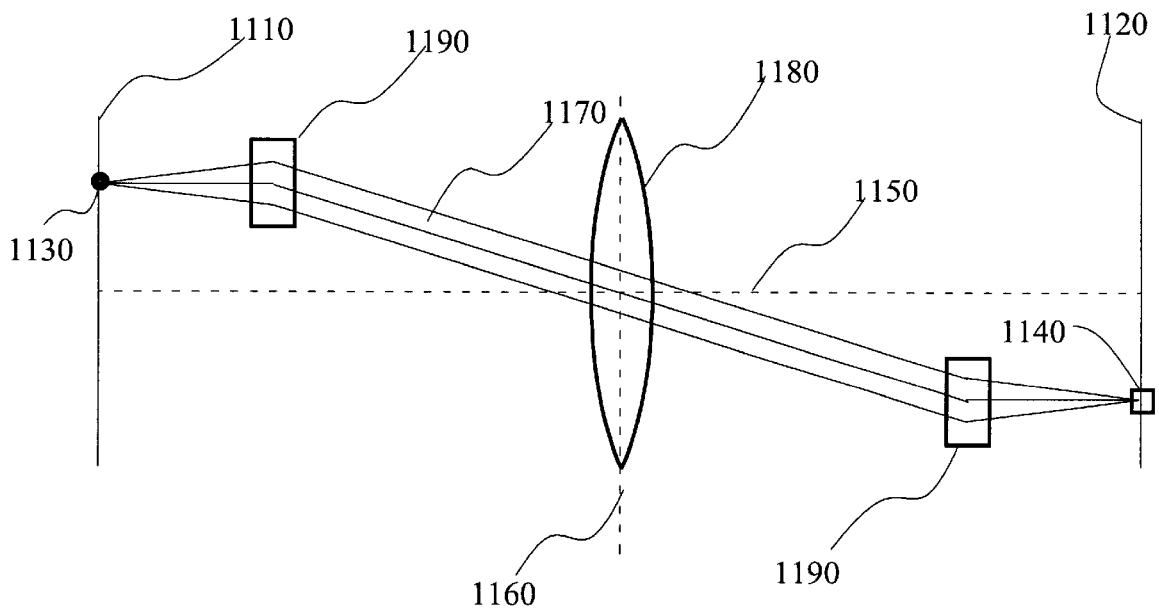
FIG. 11 shows a perspective view illustrating an alternative embodiment of the invention wherein the symmetric optical system consists of a single symmetric lens element.

FIG. 11 shows an alternative embodiment of the invention where the symmetric optical system consists of a single symmetric lens element. This lens element is placed at the midpoint of the plane containing the light sources and light detectors. In this embodiment the beam steering elements steer the light paths to the center of the single lens element. This embodiment requires only a single imaging element, thereby further reducing the cost of the interconnect system.

Figure 12:
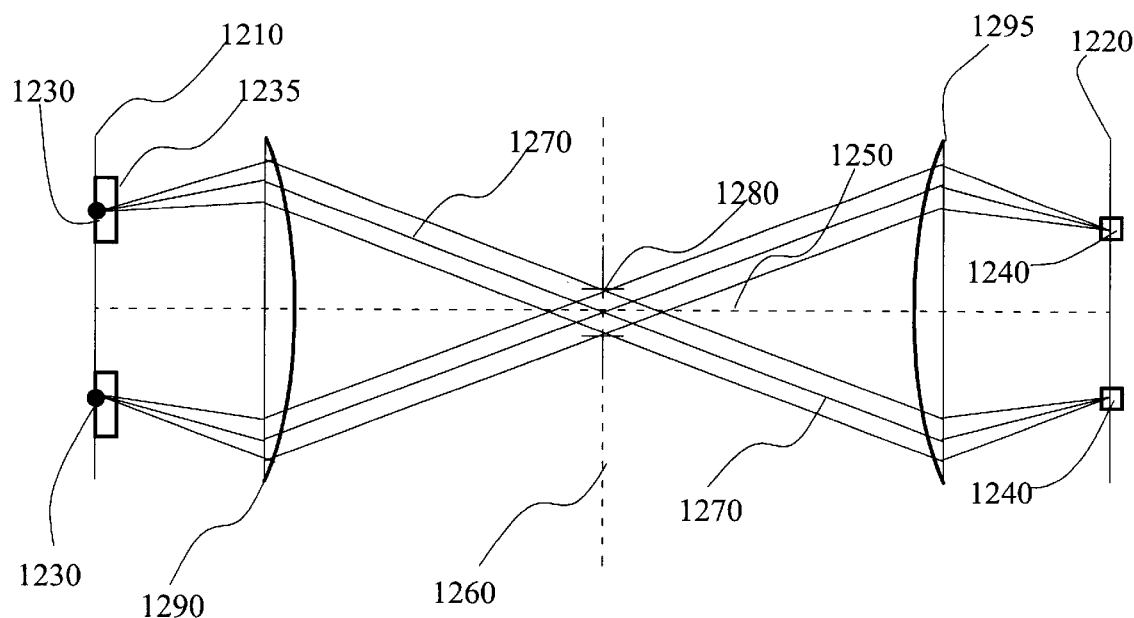
FIG. 12 shows a perspective view illustrating an alternative embodiment of the invention wherein the beam steering elements have been placed sufficiently close to, or in contact with, the light sources.
Figure 13:
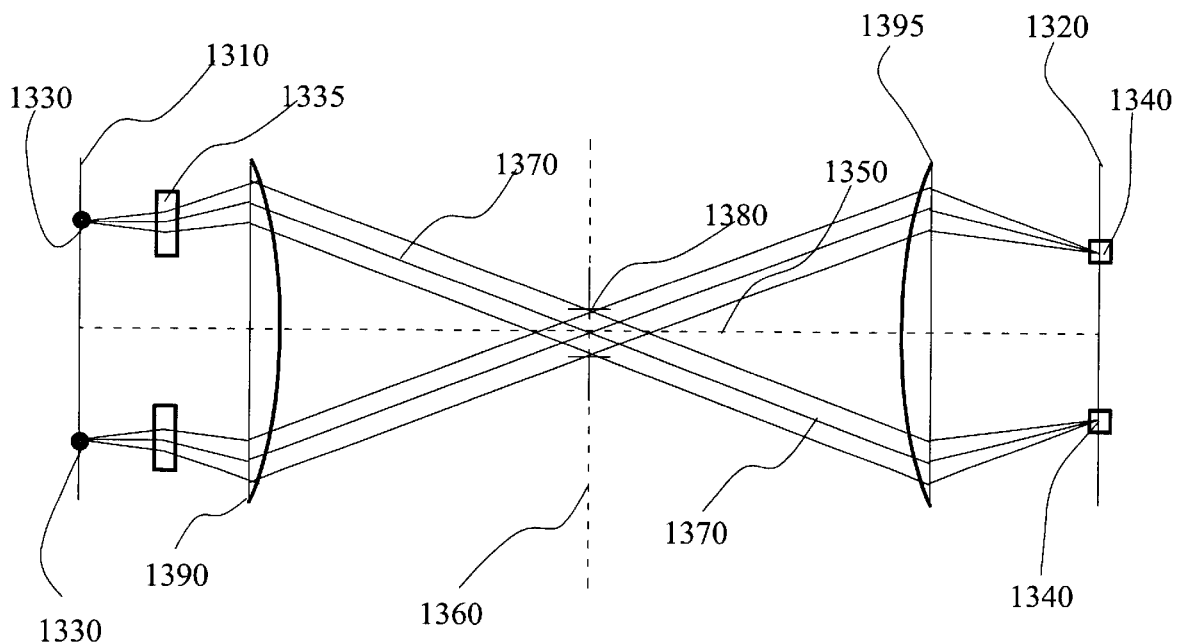
FIG. 13 shows a perspective view illustrating an alternative embodiment which does not require the beam steering elements at the light detectors.

FIG. 12 shows an alternative embodiment of the invention where the beam steering elements have been placed sufficiently close to, or in contact with, the light sources. In this embodiment the beam steering elements at the light detectors may be unnecessary, further simplifying the design. Another embodiment which does not require the beam steering elements at the light detectors is shown in FIG. 13. In this embodiment the light detectors have been moved in the image plane to a new location. This embodiment further reduces the number of elements of the invention thereby reducing its cost.

The invention can be utilized in a wide variety of data interconnection applications. Such applications include, e.g., multi-processor computers, switches for telecommunications or data communications, trellis decoders, FFT devices, or any other application which includes a high-bandwidth bisection between multiple integrated circuits.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. An optical interconnection for conducting a light beam between a plurality of light sources and a plurality of light detectors with reduced distortion, comprising:
    a symmetric imaging system, placed with its object plane in a plane of said plurality of light sources, and its image plane in a plane of said plurality of light detectors; and,
    a plurality of beam steering elements, one for each of said plurality of light sources, each configured to steer light from its corresponding light source to a new angle which causes the symmetric imaging system to have an effective aperture closer to its midpoint.

2. The optical interconnection according to claim 1, wherein a mirror is inserted in the plane of symmetry of the imaging system that folds the system back upon itself, making the object plane and image plane co-incident.

3. An optical interconnection for connecting a first integrated circuit to a second integrated circuit, comprising:
    a plurality of light sources;
    a plurality of light detectors;
    a symmetric imaging system; and,
    a plurality of beam steering elements, one for each of said plurality of light sources, each configured to steer light from its corresponding light source to a new angle which causes the symmetric imaging system to have an effective aperture closer to its midpoint.

4. The optical interconnection according to claim 3, wherein the plurality of light sources comprise light emitters.

5. The optical interconnection according to claim 3, wherein the plurality of light sources comprise vertical cavity surface-emitting laser diodes.

6. The optical interconnection according to claim 3, wherein the plurality of light sources comprise light-emitting diodes.

7. The optical interconnection according to claim 3, wherein the plurality of light sources comprise light modulators.

8. An optical interconnection for connecting integrated circuits, comprising
    a first integrated circuit having associated with it a plurality of light sources;
    a second integrated circuit having associated with it a plurality of light detectors;
    a plurality of symmetric imaging systems, each placed with its object plane in the plane of said plurality of light sources, and its image plane in the plane of said plurality of light detectors; and,
    a plurality of beam steering elements, one for each light source, configured to steer light from said light source to a new angle which causes the symmetric imaging system to have an effective aperture closer to its midpoint.

9. The optical interconnection according to claim 8, wherein the plurality of light sources comprise light emitters.

10. The optical interconnection according to claim 8, wherein the plurality of light sources comprise vertical cavity surface-emitting laser diodes.

11. The optical interconnection according to claim 8, wherein the plurality of light sources comprise light-emitting diodes.

12. The optical interconnection according to claim 8, wherein the plurality of light sources comprise light modulators.

13. The optical interconnection according to claim 8, wherein a mirror is inserted in the plane of symmetry of the imaging systems that folds the system back upon itself, making the object planes and image planes co-incident.

14. The optical interconnection according to claim 1, wherein the plurality of beam steering elements include micro-prisms.

15. The optical interconnection according to claim 1, wherein the plurality of beam steering elements include diffraction gratings.

16. The optical interconnection according to claim 1, wherein the plurality of beam steering elements include refractive elements.

17. The optical interconnection according to claim 1, wherein the plurality of beam steering elements include diffractive elements.

18. The optical interconnection according to claim 1, wherein the plurality of beam steering elements include a negative lens.

19. An optical interconnection for conducting a light beam between a plurality of light sources and a plurality of light detectors comprising:

a symmetric imaging system, having its object plane in a plane of the plurality of light sources, and its image plane in a plane of the plurality of light detectors; and, at least one beam steering element for independently steering light from each light source to a corresponding light detector such that the symmetric imaging system has an effective aperture closer to its midpoint.

20. The optical interconnection according to claim 19, wherein a mirror is inserted in a plane of symmetry of the imaging system that folds the imaging system back upon itself, making the object plane and the image plane co-incident.

21. The optical interconnection according to claim 19, wherein the at least one beam steering element includes a micro-prism.

22. The optical interconnection according to claim 19, wherein the at least one beam steering element includes a diffraction grating.

23. The optical interconnection according to claim 19, wherein the at least one beam steering element includes a refractive element.

24. The optical interconnection according to claim 19, wherein the at least one beam steering element includes a diffractive element.

25. The optical interconnection according to claim 19, wherein the at least one beam steering element includes a negative lens.

* * * * *